US008322726B2

(12) United States Patent
Kurth

(10) Patent No.: US 8,322,726 B2
(45) Date of Patent: Dec. 4, 2012

(54) COMPRESSOR SHAFT SEAL

(75) Inventor: Jürgen Kurth, Odenthal (DE)

(73) Assignee: AB SKF, Göteborg (SE)

( * ) Notice: Subject to any disclaimer, the term of this patent is extended or adjusted under 35 U.S.C. 154(b) by 738 days.

(21) Appl. No.: 11/760,072

(22) Filed: Jun. 8, 2007

(65) Prior Publication Data
US 2007/0284831 A1 Dec. 13, 2007

(30) Foreign Application Priority Data

Jun. 9, 2006 (DE) .................. 10 2006 026 812

(51) Int. Cl.
F16J 15/32 (2006.01)
(52) U.S. Cl. ........................................ 277/559
(58) Field of Classification Search .............. 277/559, 277/552, 562, 575
See application file for complete search history.

(56) References Cited

U.S. PATENT DOCUMENTS

| 2,249,141 | A | * | 7/1941 | Johnson | 277/575 |
| 3,929,340 | A | * | 12/1975 | Peisker | 277/559 |
| 4,304,414 | A | * | 12/1981 | Forch | 277/575 |
| 4,336,945 | A | * | 6/1982 | Christiansen et al. | 277/559 |
| 4,427,205 | A | * | 1/1984 | Holzer et al. | 277/559 |
| 4,504,068 | A | * | 3/1985 | Holzer | 277/555 |
| 4,747,605 | A | * | 5/1988 | Antonini | 277/558 |
| 4,783,086 | A | * | 11/1988 | Bras et al. | 277/559 |
| 4,818,620 | A | * | 4/1989 | Pilkington | 277/568 |
| 5,143,385 | A | * | 9/1992 | Sponagel et al. | 277/559 |
| 5,149,106 | A | * | 9/1992 | Takenaka et al. | 277/556 |
| 5,183,271 | A | * | 2/1993 | Wada et al. | 277/351 |
| 5,271,629 | A | * | 12/1993 | Dahlhaus et al. | 277/559 |
| 5,427,387 | A | * | 6/1995 | Johnston | 277/559 |
| 5,711,534 | A | * | 1/1998 | Bengoa et al. | 277/559 |
| 5,791,658 | A | * | 8/1998 | Johnston | 277/559 |
| 5,860,656 | A | * | 1/1999 | Obata et al. | 277/559 |
| 5,884,919 | A | | 3/1999 | Saito | |
| 5,921,555 | A | * | 7/1999 | Johnston | 277/559 |
| 6,182,975 | B1 | * | 2/2001 | Matsushima et al. | 277/559 |
| 6,367,810 | B1 | * | 4/2002 | Hatch | 277/551 |
| 6,401,322 | B1 | * | 6/2002 | Matsushima | 29/460 |
| 6,543,786 | B2 | * | 4/2003 | Osumi et al. | 277/549 |

(Continued)

FOREIGN PATENT DOCUMENTS

DE 102 44 631 A1 4/2003

(Continued)

OTHER PUBLICATIONS

Office Action issued by the German Patent Office in corresponding German Patent Application 10 2006 026 812.1 dated Jun. 24, 2010.

Primary Examiner — Vishal Patel
(74) Attorney, Agent, or Firm — Buchanan Ingersoll & Rooney PC

(57) ABSTRACT

A seal for a compressor for sealing a shaft comprises a first seal part with a sealing edge which is provided on a circular cylindrical surface along a line which deviates from a circular shape and which is closed in itself in the peripheral direction for adjoining and sealing the shaft, and a second seal part with a sealing section which is intended to adjoin the shaft and which is hollowly cylindrical when it adjoins properly with the inside surface which comprises a return structure for a fluid.

30 Claims, 3 Drawing Sheets

U.S. PATENT DOCUMENTS

| | | |
|---|---|---|
| 6,592,337 B2 | 7/2003 | Yamada et al. |
| 6,685,194 B2 * | 2/2004 | Dietle et al. ............... 277/559 |
| 6,715,769 B2 * | 4/2004 | Hosokawa et al. ......... 277/572 |
| 6,860,486 B2 * | 3/2005 | Hacker et al. .............. 277/553 |
| 7,052,020 B2 * | 5/2006 | Gobeli et al. ............... 277/549 |
| 7,147,229 B2 * | 12/2006 | Madigan ..................... 277/551 |
| 7,670,111 B2 * | 3/2010 | Maass et al. ................ 415/230 |
| 7,798,496 B2 * | 9/2010 | Dietle et al. ................ 277/551 |
| 2002/0003336 A1 * | 1/2002 | Yamada et al. ............. 277/559 |
| 2002/0003337 A1 * | 1/2002 | Yamada et al. ............. 277/559 |
| 2002/0182072 A1 * | 12/2002 | Kato et al. .................. 415/231 |
| 2003/0222407 A1 * | 12/2003 | Hosokawa et al. ......... 277/559 |
| 2007/0057471 A1 * | 3/2007 | Rentschler .................. 277/559 |
| 2009/0134585 A1 * | 5/2009 | Shimomura et al. ........ 277/562 |

FOREIGN PATENT DOCUMENTS

EP  1 211 444 A2  6/2002

* cited by examiner

US 8,322,726 B2

COMPRESSOR SHAFT SEAL

TECHNICAL FIELD

The subject matter disclosed herein generally pertains to a seal. More specifically, the subject matter relates to a seal used in a compressor for sealing a shaft.

BACKGROUND DISCUSSION

In the automotive domain, compressors in air conditioning systems are often driven unencapsulated via a shaft. The shaft penetrates the compressor housing and requires sealing against the escape of coolant and lubricating oil from the compressor interior to the atmosphere. Due to the relative speeds and operating pressures, an elastomer sealing edge of such a seal is sometimes supported by a PTFE washer using its good sliding properties, by which overly strong deformation of the elastomer sealing edge and premature wear are avoided. The indicated PTFE washers are held by virtue of being clamped between a vulcanized sealing element and an additional metallic support ring. To shield the process pressure on the PTFE contact surface to the shaft, other metallic support elements are used in the packing. In this regard, a metallic support element is vulcanized into the packing such that with a hollow cylindrical region it shields the PTFE contact surface against the process pressure and for the most part supports the elastomer sealing edge.

SUMMARY

An improved seal for a compressor possessing high wear resistance characteristics comprises a first seal part possessing a cylindrical sealing edge adapted to adjoin and seal the shaft, with the sealing edge extending along a line which deviates from a circular shape and which is closed in itself in a peripheral direction, and a second seal part with a sealing section which is adapted to adjoin the shaft and which is hollowly cylindrical when it adjoins properly with an outside surface of the shaft, with the sealing section comprising a return structure for returning a fluid.

Because the sealing edge is provided on a circular cylindrical surface and extends along a line which deviates from a circular shape (e.g., a wavy or sinusoidal shape) and which is closed in itself in the peripheral direction, the relative motion between the shaft and the sealing edge oils the shaft surface, by which advantageously even with a lack of lubrication a lubricating film forms under the sealing edge and thus wear due to abrasion is prevented. In addition, the tightness of the seal is supported by the return structure of the second seal part. The result is a seal with relatively high wear resistance.

BRIEF DESCRIPTION OF THE DRAWING FIGURES

Additional features and details associated with the disclosed sealing element will become more apparent from the embodiments of the sealing element described below and illustrated in the following drawing figures.

DETAILED DESCRIPTION

Figure 1:
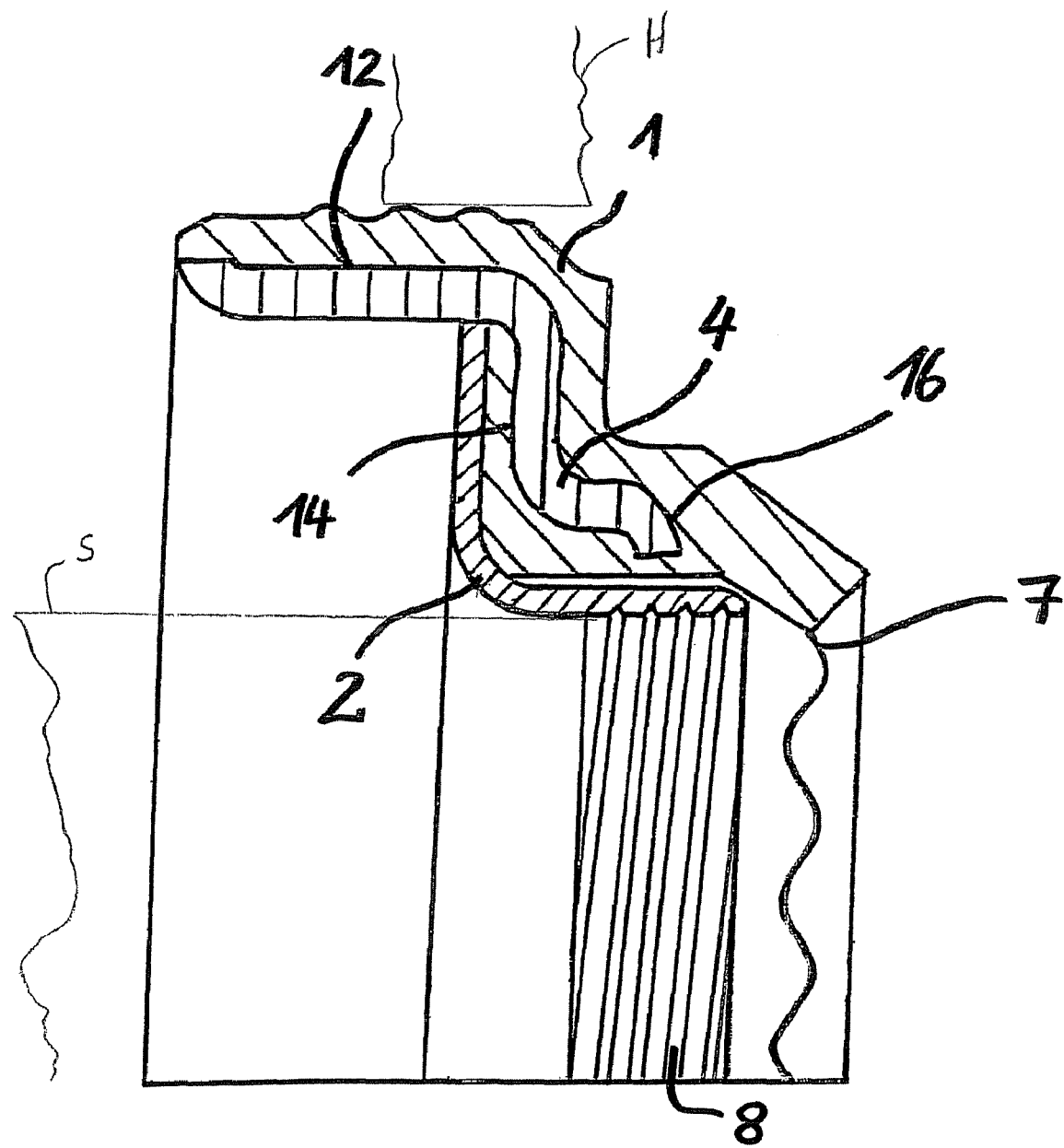
FIG. 1 is a lengthwise cross-sectional view through the upper region of a seal according to one disclosed embodiment.

FIG. 1 illustrates, in lengthwise cross-section, the upper half of a seal as disclosed herein, with the seal being shown as if it were properly located on the shaft of a compressor which is designed to turn and which is to be sealed. A portion of the shaft S is shown in FIG. 1 for illustrative purposes. At the right side of the seal, for example, there extends the interior of the compressor which is properly pressurized and which is filled by a refrigerant and/or a lubricant. The seal prevents the refrigerant and/or lubricant from penetrating into the left space, for example the atmospheric side, and also prevents dirt or the like from penetrating from the left space (atmospheric side) into the right space which is filled by the refrigerant and/or lubricant.

Figure 3:
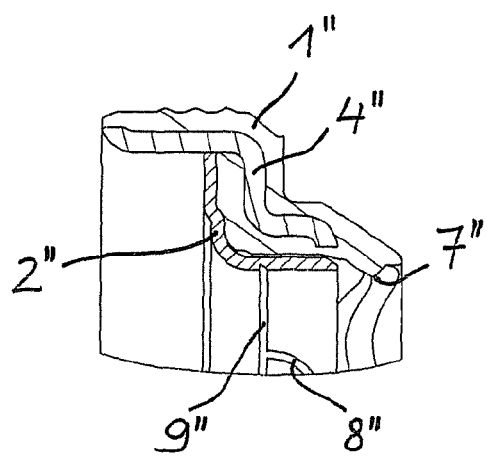
FIG. 3 is a lengthwise cross-sectional view through the upper region of a seal according to an additional disclosed embodiment.

From an overall perspective, the seal comprises three sections, an outer hollow cylindrical section 12, a ring-like or perforated disk-like section 14, and an inner hollow cylindrical section 16. The disk-like section 14 is referred to as a perforated section because of the central hole in the disk 14 as shown in FIG. 3 (and FIG. 5 discussed below). The outside surface of the outer hollow cylindrical section 12 is designed to adjoin a correspondingly made opening of a compressor housing. A portion of the housing is schematically shown in FIG. 1 (identified as H) for illustrative purposes, it being understood that in use, the housing would typically deform the corrugations on the outer surface of the outer hollow cylindrical section 12 (first seal part). The right axial end of this outer hollow cylindrical section 12 to the inside is connected to the ring-like or perforated disk-like section 14 whose inside edge is connected to the inner hollow cylindrical section 16 which extends to the right side. In the illustrated embodiment, the outer hollow cylindrical section 12 extends in the axial direction, the perforated disk-like section 14 extends radially inwardly from the end of the outer hollow cylindrical section 12, and the inner hollow cylindrical section 16 extends in the axial direction from the end of the disc-like section 24. As illustrated, the free end portion of the inner hollow cylindrical section 16 is angled slightly radially inwardly.

The seal comprises a first seal part 1 of elastomer material, a second seal part 2 of polytetrafluorethylene (PTFE), and a stiffening part 4. Thus, the first seal part 1 and the second seal part 2 are made of different materials, and the stiffening part 4 is made of a still different material, preferably metal. The stiffening part 4 and the first seal part 1 are connected to one another by vulcanization of the first seal part 1 onto the stiffening part 4. In the perforated disk-like section 14 of the seal, a radially extending surface region of the second seal part 2 is joined in a chemically-tight manner, for example by vulcanization, to the corresponding surface region of the first seal part 1. Advantageously the secure interlocking between the first and second seal part 1 and 2 reliably prevents the second seal part 2 from being turned up by the process pressure prevailing on the right side in the direction to the left side.

In the outer hollow cylindrical section 12 of the seal, the hollow cylindrical region of the stiffening part 4 is surrounded by a likewise hollow cylindrical region of the first seal part 1. In the perforated disk-like section 14 of the seal, a perforated disk-like region of the stiffening part 4 is surrounded both to the left and also the right side by the first seal part 1. In the inner hollow cylindrical section 16 of the seal is an inner hollow cylindrical region of the stiffening part 4 which is essentially surrounded on all sides by the first seal part 1, with the first seal part 1 in the section 16 being made with a sealing edge 7 which is designed to adjoin the shaft and seal it. In this connection, as shown in FIG. 1, the sealing edge 7 runs on a cylindrical surface (circular cylindrical surface) along a wavy line which deviates from a circular shape and which is closed in itself in the peripheral direction. The wavy shape of the sealing edge comprises a number of successively arranged arcs formed by a zig-zag, sinusoidal, oscillating or otherwise wavy shape. With this wavy configuration of the sealing edge, the relative motion between the shaft and the sealing edge 7 oils the shaft surface, by which advantageously, even with a lack of lubrication, a lubricating film forms under the sealing edge 7 and thus wear due to abrasion is prevented. In other embodiments, the line can also be made of several arcs, zig-zag or other than a sinusoidal wavy form as illustrated.

With proper seal installation, in the inner hollow cylindrical section 16 of the seal, a hollow cylindrical sealing section of the second seal part 2 extends which is intended to adjoin the shaft and which is connected to the first seal part 1. The second seal part 2 is dimensioned such that with proper seal installation, the hollow cylindrical sealing section of the second seal part 2 does not come into conflict with the sealing edge 7 of the first seal part 1. The hollow cylindrical sealing section of the second seal part 2 on the inner surface side is provided with a return structure, in the form of a helical groove 8, in order to achieve a return action to the sealing edge side of lubrication and/or coolant films which may be present there when the shaft turns accordingly. Instead of the helical groove 8, alternative embodiments are possible including other single-thread or multiple thread screw-like structures. The second seal part 2 can acquire or be provided with the groove-like return structure via hot stamping in a vulcanization process in which the second seal part 2 is directly chemically linked to the first vulcanized seal part 1.

The inner hollow cylindrical portion and also the perforated disk-like region of the stiffening part 4 shield the second seal part 2 against the process pressure which is present in the right space and advantageously support the first seal part 1 for sealing contact of its sealing edge 7 with the shaft. The sealing edge 7 of the first seal part 1 is supported by the second seal part 2 using its good sliding properties, and excess deformation of the sealing edge 7 and premature wear due to the relative speeds and operating pressures which arise are prevented.

Figure 2:
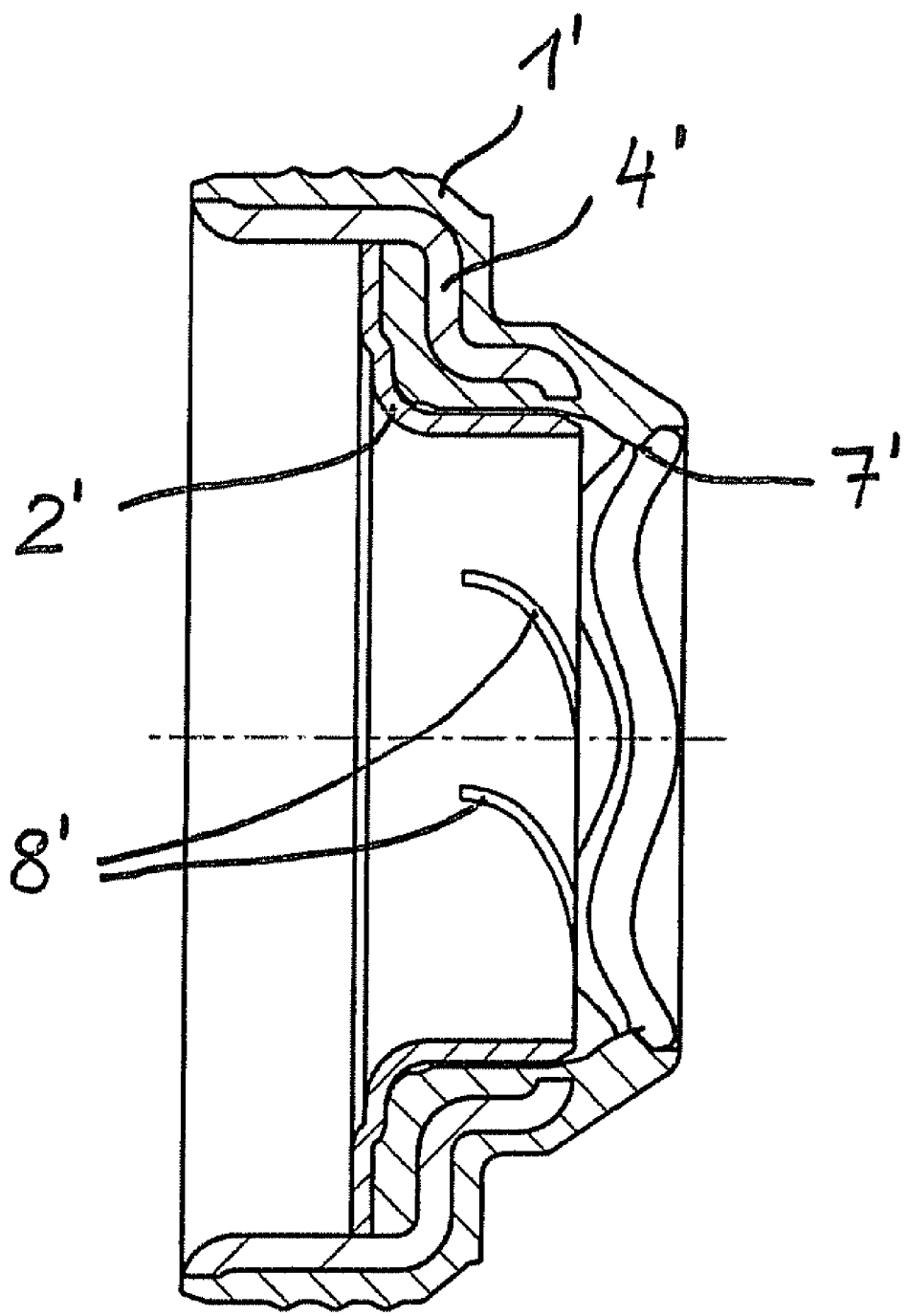
FIG. 2 is a lengthwise cross-sectional view through the upper region of a seal according to another disclosed embodiment.

FIG. 2 illustrates another embodiment, once again illustrating the seal in lengthwise cross-section through a seal according to the second embodiment. The seal of FIG. 2 differs from that of FIG. 1 essentially in that the return structure on the inside surface of the hollow cylindrical sealing section of the second seal part 2' has several arc-shaped or sickle-shaped grooves 8' which are distributed in the peripheral direction and have respective ends opening at the sealing edge side. The arc-shaped or sickle-shaped grooves are each configured to possess a gradient increasing in absolute value in a direction toward or onto the sealing edge as shown in FIG. 2 (and other drawing figures such as FIGS. 4 and 5 which are described below in more detail). The grooves 8' can be made so as to exhibit a groove-like (U-shaped or V-shaped) cross-sectional profile or a trapezoidal cross sectional profile, and begin in the axial end region of the hollow cylindrical seal section opposite the sealing edge side. Other aspects of the seal are the same as those described above in connection with the FIG. 1 embodiment and so the description applies equally here. Comparable or corresponding features or components in FIG. 2 are identified by the same reference numbers, but with the addition of a prime (') designation in FIG. 2.

FIG. 3 illustrates another embodiment of the seal and once again illustrates the upper region of the seal in lengthwise cross-section. The seal in this third embodiment differs from that of FIG. 2 essentially in that the arc-shaped grooves 8" start or proceed from a groove 9" which runs peripherally in the form of a circular ring groove and which is located on the axial end (i.e., the left end side) of the hollow cylindrical sealing section which is opposite the sealing edge side. Other aspects of the seal are the same as those described above in connection with the FIG. 2 embodiment and so the description applies equally here. Comparable or corresponding features or components in FIG. 3 are identified by the same reference numbers, but with the addition of a double prime (") designation in FIG. 3.

Figure 4:
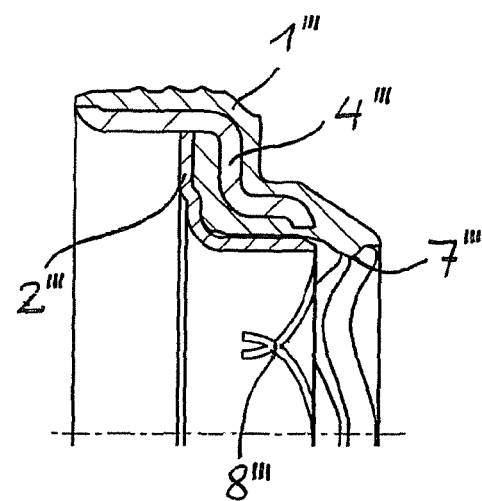
FIG. 4 is a lengthwise cross-sectional view through the upper region of a seal according to a fourth disclosed embodiment.

FIG. 4 illustrates a fourth embodiment of the seal and once again illustrates the upper region of the seal in lengthwise cross-section. The version of the seal shown in FIG. 4 differs from that of FIG. 2 essentially in that the arc-shaped grooves 8''' are provided in pairs, with the opposite direction of curvature and crossing one another. Advantageously a medium flowing to the left side in the crossing region is deflected again to the right side by the crossings. In this way, the return structure, in a manner similar to the sinusoidal sealing edge 7''' acts in both directions of rotation of the shaft. Other aspects of the seal shown in FIG. 4 are the same as those described above in connection with the FIG. 2 embodiment and so the description applies equally here. Comparable or corresponding features or components of the embodiment shown in FIG. 4 are identified by the same reference numbers as in FIG. 2, but with the addition of a triple prime ('") designation in FIG. 4.

Figure 5:
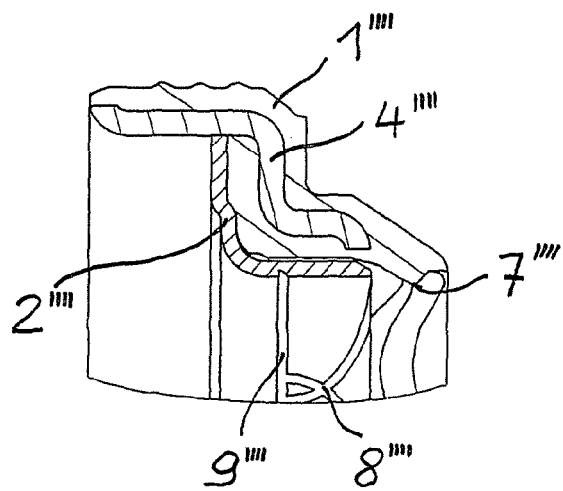
FIG. 5 is a lengthwise cross-sectional view through the upper region of a seal according to a fifth disclosed embodiment.

FIG. 5 illustrates a fifth version of the seal, once again illustrating the upper region of the seal in lengthwise cross-section. The seal of this fifth embodiment differs from that of FIG. 4 essentially in that, similar to the seal of FIG. 3, the ends of the arc-shaped grooves 8"" start from a circular ring-like groove 9"" which is located on the axial end of the hollow cylindrical sealing section which is opposite the sealing edge side. Other aspects of the seal shown in FIG. 5 are the same as those described above in connection with the FIG. 4 embodiment and so the foregoing description applies equally here. Comparable or corresponding features or components of the embodiment shown in FIG. 5 are identified by the same reference numbers as in FIG. 4, but with the addition of a quadruple prime ('"") designation in FIG. 5.

Figure 6:
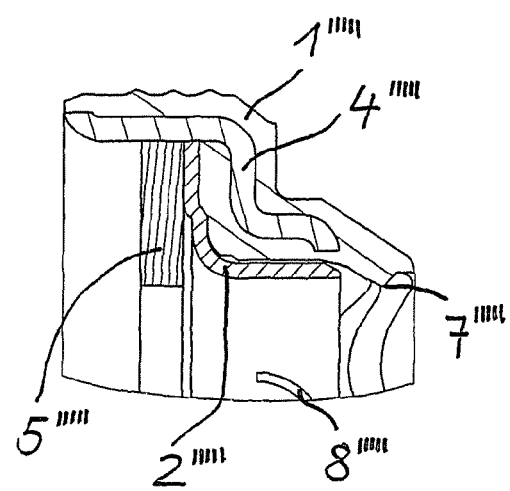
FIG. 6 is a lengthwise cross-sectional view through the upper region of a seal according to a sixth disclosed embodiment.

FIG. 6 illustrates a further embodiment of the seal, illustrating the upper region of the seal in lengthwise cross-section. The seal shown in FIG. 6 differs from that of the FIG. 2 embodiment essentially in that on the axial end opposite the sealing edge side, the second seal part 2'"" is provided with another seal part 5'"" of a gas diffusion-capable fabric, for example of formed fabric. This other seal part 5'"" which is located on the atmosphere side of the seal is securely joined to the second seal part 2'"" and is constructed so that it touches the shaft and surrounds it, thus preventing penetration of solids into the sealing region of the first and second seal part 1'"" and 2'"" from the air side. Due to the open-pore structure of the formed fabric, only small additional friction forces arise, and vacuum formation on the air side of the second seal part 2'''' is advantageously prevented. Therefore, penetration of abrasive particles into the actual seal region is prevented. At the same time though, ventilation of the seal is ensured. Other aspects of the seal shown in FIG. 6 are the same as those described above in connection with the FIG. 2 embodiment and so the foregoing description applies equally here. Comparable or corresponding features or components of the embodiment shown in FIG. 6 are identified by the same reference numbers as in FIG. 2, but with the addition of a five prime (''''') designation in FIG. 6.

The principles, preferred embodiments and other disclosed aspects have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. Seal for a compressor to adjoin and seal a shaft having a shaft surface, comprising:
    a first seal part possessing a cylindrical sealing edge adapted to adjoin and seal the shaft, the sealing edge extending along a line which deviates from a circular shape and which is closed in itself in a peripheral direction, the line along which the sealing edge extends is wavy, comprising several arcs so that relative motion between the shaft and the sealing edge lubricates the shaft surface to prevent wear of the sealing edge due to abrasion; and
    a second seal part with a sealing section which is adapted to adjoin the shaft and which is hollowly cylindrical when the sealing section adjoins properly with an outside surface of the shaft, the sealing section comprising a return structure for returning a fluid, the sealing section configured to extend along the outside surface of the shaft between the first seal part and the shaft when the sealing section properly adjoins the outside surface of the shaft, and the second seal part is directly joined to the first seal part chemically,
    wherein the second seal part comprises a radially extending first surface facing the first seal part and an opposing radially extending second surface facing in an opposite direction than the first surface, and the radially extending second surface is free of direct contact with other elements of the seal.

2. Seal as claimed in claim 1, wherein the return structure comprises at least three grooves spaced apart in a peripheral direction.

3. Seal as claimed in claim 2, wherein when the sealing section properly adjoins the shaft, at least one of the grooves extends as an arc-shaped groove.

4. Seal as claimed in claim 3, wherein the arc-shaped groove possesses a gradient increasing in absolute value in a direction toward the sealing edge.

5. Seal as claimed in claim 2, wherein at least one of the grooves opens to a side of the sealing edge.

6. Seal as claimed in claim 2, wherein at least two of the grooves cross one another.

7. Seal as claimed in claim 1, wherein in an axial end region of the sealing section opposite the sealing edge, the return structure comprises a groove which extends peripherally as a circular ring groove.

8. Seal as claimed in claim 7, wherein the return structure further comprises at least one additional groove which starts from the circular ring groove.

9. Seal as claimed in one of claim 1, wherein the first seal part is made from a first material and the second seal part is made from a second material different from the material forming the first seal part.

10. Seal as claimed in claim 9, wherein the second material is polytetrafluorethylene (PTFE).

11. Seal as claimed in claim 10, wherein the first material is an elastomer material.

12. Seal as claimed in claim 1, further comprising a stiffening part, wherein the first seal part is vulcanized to the stiffening part.

13. Seal as claimed in claim 12, wherein the stiffening part is made from a metal.

14. Seal as claimed in claim 1, further comprising a stiffening part, wherein the second seal part comprises a radially extending first surface region connected to at least one of the first seal part and the stiffening part, and a radially extending second surface region of the second seal part opposite the first surface region and free of contact with the stiffening part.

15. Seal as claimed in claim 1, wherein an axial end region of the sealing edge of the first seal part and the sealing section of the second seal part are constructed such that the sealing section extends axially and is free of collision with the sealing edge when the seal is properly installed.

16. Seal as claimed in claim 1, further comprising a third seal part which is adapted to surround and seal the shaft.

17. Seal as claimed in claim 16, wherein the third seal part comprises a gas diffusion-capable fabric that is nonwoven.

18. Seal as claimed in claim 1, wherein the seal comprises an outer hollow cylindrical section, a perforated disk-like section which is connected to an axial end of the outer hollow cylindrical section and continues towards inside from the outer hollow cylindrical section, and an inner hollow cylindrical section connected to an inside edge of the perforated-disk like section and extending away from the outer hollow cylindrical section.

19. Seal as claimed in claim 18, wherein the outer hollow cylindrical section comprises a hollow cylindrical region of a stiffening part whose outer surface is connected to a hollow-cylindrical region of the first seal part.

20. Seal as claimed in claim 18, wherein in the perforated-disk like section, the second seal part is connected to the first seal part.

21. Seal as claimed in claim 18, wherein in the inner hollow cylindrical section the first seal part forms the sealing edge.

22. Seal as claimed in claim 1, wherein the return structure is configured as at least one curvalinear groove.

23. Seal as claimed in claim 22, wherein the at least one curvalinear groove is arc-shaped.

24. Seal as claimed in claim 23, wherein the return structure is configured as a screw thread.

25. Seal as claimed in claim 1, wherein the first seal part includes a conically shaped portion having a radially outward surface, the radially outward surface extending from a location of the first seal part which axially overlaps the sealing section of the second seal part to a free end of the first seal part, and the radially outward surface being linear over the entire length of the radially outward surface.

26. Seal for a compressor to adjoin and seal a shaft having a shaft surface, comprising:
- a first seal part possessing a cylindrical sealing edge adapted to adjoin and seal the shaft, the sealing edge extending along a line which deviates from a circular shape and which is closed in itself in a peripheral direction, the line along which the sealing edge extends is wavy, comprising several arcs so that relative motion between the shaft and the sealing edge lubricates the shaft surface to prevent wear of the sealing edge due to abrasion; and
- a second seal part with a sealing section which is adapted to adjoin the shaft and which is hollowly cylindrical when the sealing section adjoins properly with an outside surface of the shaft, the sealing section comprising a return structure for returning a fluid, the sealing section configured to extend along the outside surface of the shaft between the first seal part and the shaft when the sealing section properly adjoins the outside surface of the shaft, and the second seal part is directly joined to the first seal part chemically;
- wherein the seal comprises an outer hollow cylindrical section, a perforated disk-like section which is connected to an axial end of the outer hollow cylindrical section and continues towards inside from the outer hollow cylindrical section, and an inner hollow cylindrical section connected to an inside edge of the perforated-disk like section and extending away from the outer hollow cylindrical section; and
- wherein the perforated-disk like section comprises a perforated-disk like region of a stiffening part which is surrounded completely by the first seal part.

27. Seal for a compressor to adjoin and seal a shaft having a shaft surface, comprising:
- a first seal part possessing a cylindrical sealing edge adapted to adjoin and seal the shaft, the sealing edge extending along a line which deviates from a circular shape and which is closed in itself in a peripheral direction, the line along which the sealing edge extends is wavy, comprising several arcs so that relative motion between the shaft and the sealing edge lubricates the shaft surface to prevent wear of the sealing edge due to abrasion; and
- a second seal part with a sealing section which is adapted to adjoin the shaft and which is hollowly cylindrical when the sealing section adjoins properly with an outside surface of the shaft, the sealing section comprising a return structure for returning a fluid, the sealing section configured to extend along the outside surface of the shaft between the first seal part and the shaft when the sealing section properly adjoins the outside surface of the shaft, and the second seal part is directly joined to the first seal part chemically;
- wherein the seal comprises an outer hollow cylindrical section, a perforated disk-like section which is connected to an axial end of the outer hollow cylindrical section and continues towards inside from the outer hollow cylindrical section, and an inner hollow cylindrical section connected to an inside edge of the perforated-disk like section and extending away from the outer hollow cylindrical section; and
- wherein the inner hollow cylindrical section comprises a hollow cylindrical region of a stiffening part which is completely surrounded by the first seal part.

28. Seal for a compressor to adjoin and seal a shaft having a shaft surface, comprising:
- a first seal part possessing a cylindrical sealing edge adapted to adjoin and seal the shaft, the sealing edge extending along a line which deviates from a circular shape and which is closed in itself in a peripheral direction, the line along which the sealing edge extends is wavy and presents alternating concave portions and convex portions so that relative motion between the shaft and the sealing edge lubricates the shaft surface to prevent wear of the sealing edge due to abrasion; and
- a second seal part with a sealing section which is adapted to adjoin the shaft and which is hollowly cylindrical when the sealing section adjoins properly with an outside surface of the shaft, the sealing section comprising a return structure for returning a fluid, the return structure configured as a screw thread, and the second seal part is directly joined to the first seal part chemically,
- wherein the second seal part comprises a radially extending first surface facing the first seal part and an opposing radially extending second surface facing in an opposite direction than the first surface, and the radially extending second surface is free of direct contact with other elements of the seal.

29. Seal for a compressor to adjoin and seal a shaft having a shaft surface, comprising:
- a first seal part possessing a cylindrical sealing edge adapted to adjoin and seal the shaft, the sealing edge extending along a line which deviates from a circular shape and which is closed in itself in a peripheral direction, the line along which the sealing edge extends is wavy and presents alternating concave portions and convex portions so that relative motion between the shaft and the sealing edge lubricates the shaft surface to prevent wear of the sealing edge due to abrasion; and
- a second seal part with a sealing section which is adapted to adjoin the shaft and which is hollowly cylindrical when the sealing section adjoins properly with an outside surface of the shaft, the sealing section comprising a return structure for returning a fluid, the return structure configured as a screw thread, and the second seal part is directly joined to the first seal part chemically
- wherein the seal comprises an outer hollow cylindrical section, a perforated disk-like section which is connected to an axial end of the outer hollow cylindrical section and continues towards inside from the outer hollow cylindrical section, and an inner hollow cylindrical section connected to an inside edge of the perforated-disk like section and extending away from the outer hollow cylindrical section; and
- wherein the perforated-disk like section comprises a perforated-disk like region of a stiffening part which is surrounded completely by the first seal part.

30. Seal for a compressor to adjoin and seal a shaft having a shaft surface, comprising:
- a first seal part possessing a cylindrical sealing edge adapted to adjoin and seal the shaft, the sealing edge extending along a line which deviates from a circular shape and which is closed in itself in a peripheral direction, the line along which the sealing edge extends is wavy and presents alternating concave portions and convex portions so that relative motion between the shaft and the sealing edge lubricates the shaft surface to prevent wear of the sealing edge due to abrasion; and
- a second seal part with a sealing section which is adapted to adjoin the shaft and which is hollowly cylindrical when the sealing section adjoins properly with an outside surface of the shaft, the sealing section comprising a return structure for returning a fluid, the return structure configured as a screw thread, and the second seal part is directly joined to the first seal part chemically wherein the seal comprises an outer hollow cylindrical section, a perforated disk-like section which is connected to an axial end of the outer hollow cylindrical section and continues towards inside from the outer hollow cylindrical section, and an inner hollow cylindrical section connected to an inside edge of the perforated-disk like section and extending away from the outer hollow cylindrical section; and wherein the inner hollow cylindrical section comprises a hollow cylindrical region of a stiffening part which is completely surrounded by the first seal part.

* * * * *